Jan. 10, 1961 W. M. FUJII 2,967,673

REELING SYSTEM

Filed May 2, 1955 2 Sheets-Sheet 1

INVENTOR.
Wesley M. Fujii
BY Morris L. Rabkin
ATTORNEY

INVENTOR.
Wesley M. Fujii
BY Morris A. Rabkin
ATTORNEY

United States Patent Office 2,967,673

Patented Jan. 10, 1961

2,967,673

REELING SYSTEM

Wesley M. Fujii, Haddonfield, N.J., assignor to Radio Corporation of America, a corporation of Delaware Filed May 2, 1955, Ser. No. 505,107

9 Claims. (Cl. 242—55.12)

This invention relates to a reeling system, and more particularly to braking means for the reels of a magnetic recording system.

In magnetic recording systems of the type in which a magnetic tape record is reeled, from one reel past a transducing station, and then onto a second reel, it is desirable that suitable braking means be provided for arresting the rotational motion of the two reels in such a manner as to prevent the spillage of tape from one of the reels during braking while, at the same time, avoiding the breaking of the tape by too great an inequality in the braking forces applied to the two reels. Additionally, it is highly desirable that the braking means be uncomplicated and economical in structure and operation.

Accordingly, it is an object of the present invention to provide an improved reeling system wherein improved braking means are employed to arrest the rotational motion of each of a pair of reels.

It is another object of the present invention to provide an improved reel braking means suitable for use in magnetic recording systems.

It is a further object of the present invention to provide an improved braking means as set forth which is characterized in that the apparatus embodying the invention is both simple and economical in construction and in operation.

In accomplishing these and other objects, there has been provided, in accordance with the present invention, in a reeling system in which a tape record is driven from one reel to another, and in which separate driving means are provided for each of the two reels, a brake member associated with each of the reels in such a way that a braking disk is caused to describe a substantially helical path in effecting either a braking or a releasing of the two reels. The helical path arrangement provides means whereby the braking force is regenerative when a reel is being turned in a direction to remove tape therefrom and degenerative when the movement is in a direction to wind tape onto the reel.

A better understanding of this invention may be had from the following detailed description when read in connection with the accompanying drawings in which.

Figure 1:
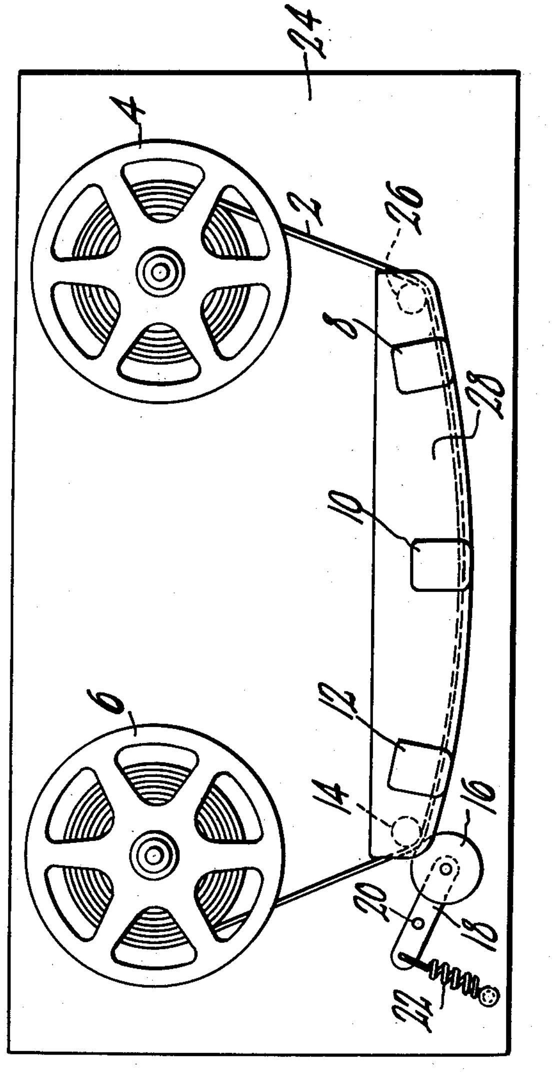
Fig. 1 is a plan view of a magnetic record reeling system of the type which may incorporate the present invention.

Referring now to the drawings in more detail, there is shown in Fig. 1 a magnetic recording system wherein a magnetic record tape 2 is arranged to be driven between a supply reel 4 and a takeup reel 6. In the path of movement between these two reels there is positioned a magnetic record transducing station which may include, for example, an erasing head 8, a recording head 10, and a reproducing head 12. When the apparatus is conditioned for transducing, the tape is driven at a predetermined constant velocity by a capstan 14. The tape 2 is held in intimate driving contact with the capstan 14 by a pressure roller 16. This pressure roller is mounted on a pivoted arm 18. The arm 18 is mounted for pivotal motion about a pivot member 20 and is biased in a direction to cause engagement of the pressure roller with the capstan by a spring 22. The apparatus thus far described is mounted on the front surface of a mounting panel 24. The three heads 8, 10 and 12 and the capstan 14, as well as a tape guide member 26, may be enclosed in a suitable housing or cover member 28.

Figure 2:
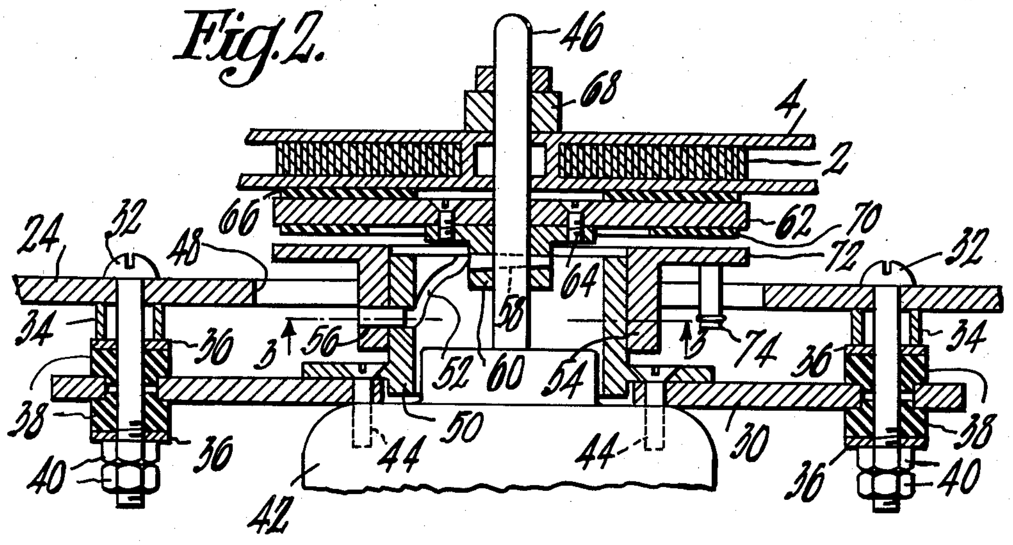
Fig. 2 is a cross sectional view of a portion of the reeling system illustrating one embodiment of the present invention.

In Fig. 2, there is shown the details of the structure by which each of the reels 4 and 6 is mounted on the panel 24. In particular, the structure for mounting the supply reel 4 is illustrated. The structure for mounting the take-up reel 6 is essentially identical and is therefore not described in detail herein. A mounting bracket 30 is supported from the panel 24 by means of a plurality of screws 32. The bracket 30 is spaced from the panel 24 by means of spacer collars 34. Metal washers 36 and resilient washers 38 provide means for resiliently mounting the bracket 30 with respect to the panel 24. A pair of nuts 40 on each of the screws 32 hold the bracket in place as described.

A motor 42 is held onto the bracket 30 by a plurality of screws 44. The motor 42 has a shaft 46 which extends centrally through an opening 48 in the panel 24. Also secured to the bracket 30 by means of the screws 44 is an inner sleeve member 50. This sleeve is fixed with respect to the motor 42 and the bracket 30. A helical cam slot 52 is provided in the sleeve which opens on the edge of the sleeve remote from the motor. This arrangement is more clearly shown in Fig. 4. An outer sleeve member 54 is positioned surrounding the inner sleeve member 50 and carries a cam follower pin 56 which rides in the helical cam slot 52.

Fixed to the motor shaft 46, as by taper pin 58, is a collar 60. A reel driving disk 62 is secured to the collar 60 as by screws 64. The reel, which is illustrated as being the supply reel 4, engages a resilient pad 66, of material such as rubber, secured to one face of the disk 62. The reel is held in this position surrounding the shaft 46 by a suitable holding means 68 which may, for example, be a collet.

The face of the disk 62 opposite from the reel is provided with a layer of friction material 70 such as felt or cork. A disk member secured to or integral with the outer sleeve 54 comprises a flange 72 which extends in a direction parallel to the face of the disk 62 carrying the layer of friction material 70 and which constitutes a brake surface. If the outer sleeve is rotated slightly about the inner sleeve in one direction, the coaction between the pin 56 and the helical slot 52 causes the brake surface of the flange 72 to be retracted, along a helical path, from the friction layer surface of the disk 62. On the other hand, if the outer sleeve is rotated in the opposite direction, the coaction between the pin 56 and the slot 52 causes the brake surface of the flange 72 to move along a helical path into engagement with the friction layer 70 on the disk 62.

Figures 3, 4:
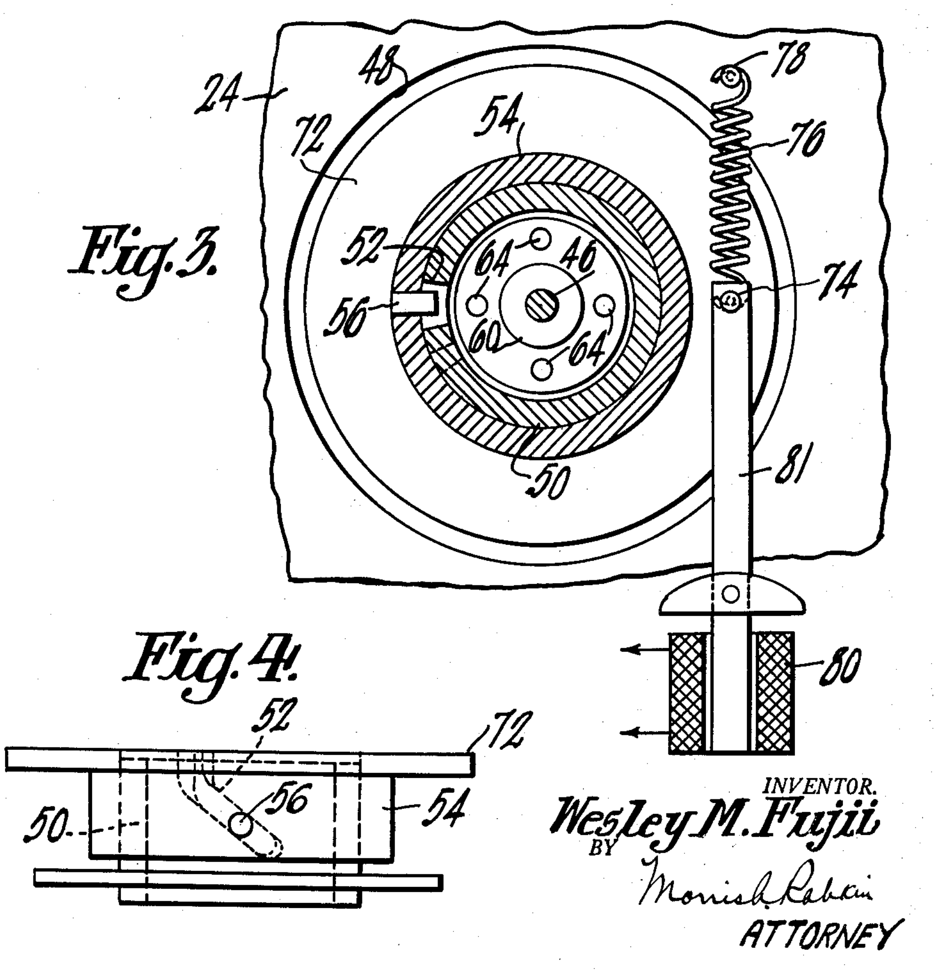
Fig. 3 is a view, partly in section, taken along the line 3—3 of Fig. 2 as viewed in the direction of the arrows.
Fig. 4 is an elevational view of a brake member showing details of a portion of the structure shown in Fig. 2.

When the flange is retracted from engagement with the disk 62, no braking forces are applied to the reel. However, when the flange is moved into engagement with the disk, a braking force is applied which is a function of the interfacial pressure between the brake surface of the flange and the friction material 70 on the face of the disk 62. In order to control the application of this braking force, the apparatus is arranged substantially as shown in Fig. 3. A pin 74 depends from the surface of the flange 72. A spring 76 is coupled between the pin 74 and an anchor pin 78 on the panel 24. The spring biases the outer sleeve in a direction to cause engagement between the flange 72 and the friction surface of the disk 62. A solenoid 80 is also coupled to the pin 74 by a link 81 and, when energized, exerts a force on the flange which opposes and overpowers the spring 76. With this arrangement, whenever it is desired to drive the reels, the motor associated with the particular reel is energized. Simultaneously therewith, the solenoid is also energized. This causes the brake arrangement to be disengaged. Whenever it is desired to arrest the motion of the reel, the motors and the solenoid are deenergized allowing the spring to rotate the outer sleeve 54 to bring the braking arrangement into engagement.

It will be noted, with reference to Figs. 2, 3 and 4, that the pin 56 in the outer sleeve engages the helical slot 52. If, at the time the brake is applied, the reel is turning in a direction such as would tend to cause the flange 72 to turn in the same direction as it would be turned by the spring, then the pin 56 tends to climb in the helical slot 52. This tends to increase the braking force applied to the disk 62 and, hence, the reel. In this direction of rotation of the reel, the braking action may be said to be regenerative. On the other hand, if, at the time the brakes are applied, the reel is turning in a direction tending to oppose the action of the spring, then the rotation tends to cause the pin 56 to be retracted in the helical slot 52. This tends to cause the braking force to be lessened. In this direction of rotation of the reel, the braking force may be said to be degenerative.

In order to maintain the proper amounts of tension in the web or tape being reeled, and to prevent tape from being spilled from the reels during the stopping process, the regenerative and degenerative action of the brakes is employed. Thus, when one of the reels is being driven in a direction to wind the tape onto the reel, the braking action is degenerative, while the braking action on the reel from which the tape is being withdrawn is regenerative. Thus, the primary stopping force is applied to the reel from which the tape is being withdrawn. A lessened stopping force is applied to the takeup reel, allowing the inertia of that reel to maintain a tension in the tape. It has been found that a desired slope of the helical slot is approximately $45° \pm 10°$. If the angle of the slope is appreciably less than that indicated with respect to the face of the disk, then the regenerative braking action may cause the brake to "grab," while the degenerative braking action will cause the brake to be substantially inoperative. This large inequality in the braking force may cause a breakage of the tape. On the other hand, if the angle of slope is appreciably greater than that indicated with respect to the face of the flange then the difference between the regenerative and the degenerative braking is reduced to an ineffectual difference and may result in tape spillage or inadequate stopping.

Figure 6:
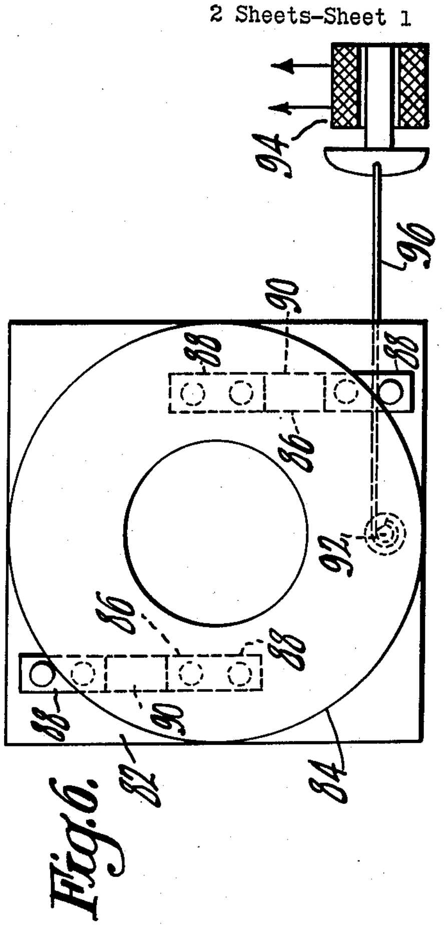
Fig. 6 is a plan view of the structure shown in Fig. 5.
Figure 5:
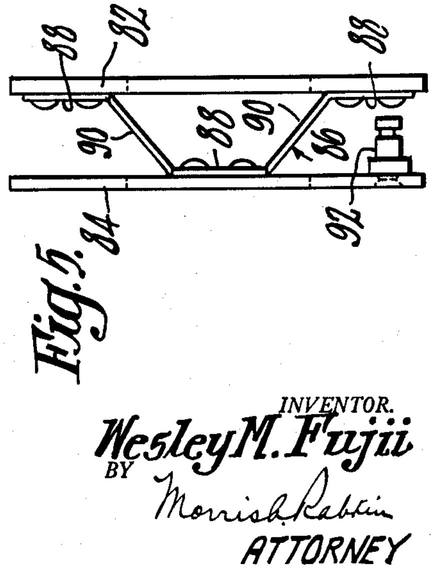
Fig. 5 is an elevational view of a different structure also embodying the present invention.

With reference now to Figs. 5 and 6, there is shown a somewhat different structure which also embodies the present invention. As was the case for the embodiment of the invention illustrated in Figs. 2, 3 and 4, the structure for use with both the supply reel and the take-up reel is essentially identical so that only one structure is described in detail herein. In Figs. 5 and 6 there is shown a bracket 82 which is comparable, in function, to the bracket 30 shown in Fig. 2. A disk 84 is supported in parallel relation with the bracket 82 by a plurality of leaf springs 86, two such springs being illustrated. The disk 84 is comparable to the flange 72 in that this disk engages the friction surface of the reel driving disk 62, and constitutes a brake surface. The leaf springs 86 are formed to have a pair of parallel end portions 88 and an angularly disposed center portion 90. The parallel end portions 88 are secured respectively to the bracket 82 and one face of the disk 84. The springs are arranged spirally about the disk so that the springs extend in a tangential relation with respect to a common circle on the disk so that a rotational force applied to the disk 84 will cause that disk to move in a substantially helical path toward or away from the bracket 82.

In position on the apparatus, the springs normally hold the brake surface of the disk 84 in interfacial engagement with the friction surface of the reel driving disk. A pin or boss 92 depends from the face of the disk 84. A solenoid 94 is coupled by a link member 96 to this pin 92. Here again, as in the previous example, when it is desired to operate the machine, the solenoid 94 is energized simultaneously with the reel driving motors. The solenoid 94 causes a slight rotational movement of the disk 84 against the force of the springs 86. This causes the disk 84 to be retracted, along a helical path, out of braking engagement with the reel driving disk.

The slope of the center portion 90 of the springs 86 is again approximately 45°. These springs are so positioned that the braking force on the takeup reel, or the reel onto which the tape is being wound, is degenerative, while the braking force on the reel from which the tape is being withdrawn is regenerative. When it is desired to stop the motion of the reels, the solenoid is deenergized simultaneously with the drive motors, allowing the spring action of the leaf springs 86 to apply the braking force to the reel driving disks. It will be obvious that the slope of the slots or the springs used in the braking means for the supply reel and the take-up reel in any reeling system will depend upon the sense of rotation of the respective supply and take-up reels, when the tape is wound on or unwound from the reels to obtain the desired regenerative and degenerative braking action. In the system illustrated by way of example in Fig. 1, both the supply reel 4 and the take-up reel 6 rotate in the same direction when tape is wound on one of them and unwound from the other. Accordingly, the slopes of the slots or springs in the braking means for the supply reel 4 and the take-up reel 6 shown in Fig. 1 will be opposite to each other. In other reeling systems where the supply reel and take-up reel rotate in opposite directions when tape is being unwound from one of the reels and wound onto the other, the slopes of the slots or springs in the braking means associated with the reels will be in the same direction.

Thus there has been provided an improved reeling system featuring an improved braking means for arresting the motion of the reels. The improved braking means are characterized by simplicity and economy in construction and operation.

What is claimed is:

1. In a reeling system for driving a reelable member between a supply reel and a takeup reel, means for driving each of said reels, brake means operatively coupled to each of said reel driving means, each of said brake means including means defining a brake surface, means for urging said surface into engagement with said reel driving means, and means for defining a helical path of movement for said brake surface defining means whereby braking forces applied to said reel driving means are regenerative in one direction of rotation of said reel driving means and degenerative for rotation in the opposite direction.

2. In a reeling system for driving a reelable member between a supply reel and a takeup reel, means for driving each of said reels, brake means operatively coupled to each of said reel driving means, each of said brake means including means defining a brake surface, said brake surface defining means being spring biased into braking engagement with said reel driving means, selectively operable control means coupled to said brake means, said last named means being operable to disengage said brake surface from said reel driving means, and means for defining a helical path of movement for said brake surface defining means whereby braking forces applied to said reel driving means are regenerative in one direction of rotation of said reel driving means and degenerative for rotation in the opposite direction.

3. In a reeling system for driving a reelable member between a supply reel and a takeup reel, means for driving each of said reels, brake means coupled to each of said reel driving means, each of said brake means including a disk member defining a brake surface, each said disk member being spring biased for movement along a helical path of movement into braking engagement with the associated one of said reel driving means, control means operable to disengage each said disk member from said reel driving means, and means for defining said helical path of movement for each said disk member.

4. In a reeling system for driving a reelable member between a supply reel and a takeup reel, means including disks for driving each of said reels, different brake means for said supply reel and for said takeup reel, each of said means being individually operatively coupled to the respective said reel driving disks for said supply reel and for said take-up reel, each of said brake means including a brake disk defining a brake surface, each of said brake disks being spring biased for movement along a helical path of movement into braking engagement with the associated one of said reel driving means, selectively operable solenoid means coupled to each said brake disk, said solenoid means being operable to disengage each said brake disk from its associated said reel driving disk, and means for defining said helical path of movement for each said brake disk, said path extending between positions of engagement and disengagement of each said brake disk with the associated one of said reel driving disks, said helical path of the one of said brake disks in said brake means for said supply reel having a slope in a direction to augment the spring bias of the one of said disks for driving said supply reel, said helical path of the one of said brake disks in said brake means for said takeup reel having a slope in a direction to decrease the effect of said spring bias of the one of said disks for driving said takeup reel.

5. In a reeling system for driving a reelable member between a supply reel and a takeup reel, disk means for driving each of said reels, brake means operatively coupled to each of said disk means, each of said brake means including an inner sleeve member, an outer sleeve member, a flange on said outer sleeve member defining a brake surface, said inner sleeve member having a helical cam slot therein, a cam follower pin carried by said outer sleeve member and extending into said slot for coaction therewith, said slot and said pin comprising means defining a helical path of movement of said outer sleeve member relative to said inner sleeve member, and spring biasing means for biasing said outer sleeve member rotationally in a direction relative to said inner sleeve member of each said brake means whereby coaction of said pin and said slot causes said flange to be held in braking engagement with said disk means, and selectively operable solenoid means coupled to said outer sleeve member of each said brake means, said solenoid means being operable to oppose said spring biasing means whereby to effect disengagement of said flange of each said brake means from its associated said disk means.

6. In a reeling system for driving a reelable member between a supply reel and a takeup reel, disk means for driving each of said reels, brake means operatively coupled to each of said disk means, each of said brake means including an inner sleeve member, an outer sleeve member, a flange on said outer sleeve member defining a brake surface, one of said sleeve members having a helical cam slot therein, said slot having a slope of about 45° with respect to the axis of said inner sleeve member, a cam follower pin carried by the other one of said sleeve members and extending into said slot for coaction therewith, said slot and said pin comprising means defining a helical path of movement of said outer sleeve member relative to said inner sleeve member, and spring bias means for biasing said outer sleeve member rotationally in a direction relative to said inner sleeve member whereby coaction of said pin and said slot causes said flange to be held in braking engagement with said disk means, and selectively operable solenoid means coupled to said outer sleeve member of each said brake means, said solenoid means being operable to oppose said spring bias means of each said brake means whereby to effect disengagement of said flange of each said brake means from its associated said disk means.

7. In a reeling system for driving a reelable member between a supply reel and a takeup reel, means including disks for driving each of said reels, brake means operatively coupled to each of said reel driving disks, each of said brake means including a brake disk defining a brake surface, a mounting bracket, spring means connected between said brake disk and said mounting bracket for supporting said brake disk in spaced relation with respect to said bracket, said spring means biasing said brake disk into braking engagement with said reel driving disk, means including said spring means for defining a helical path of movement for said brake disk between engagement and disengagement with the associated one of said reel driving disks, and selectively operable means coupled to said brake disk of each said brake means for effecting movement of said brake disk of each said brake means along said helical path thereof to disengage said brake disk of each said brake means from one of its associated said reel driving disks.

8. In a reeling system for driving a reelable member between a supply reel and a takeup reel, means including disks for driving each of said reels, brake means operatively coupled to each of said reel driving disks, each of said brake means including a brake disk defining a brake surface, a mounting bracket, leaf spring members connected between said brake disk and said mounting bracket for supporting said brake disk in spaced relation with respect to said bracket, each of said leaf spring members having parallel end portions and an angularly disposed center portion, one of said end portions being secured to said bracket while the other of said end portions is secured to said brake disk, said leaf spring members being secured to said brake disk in spiral array to define a helical path of movement for said brake disk, said brake disk being biased into braking engagement with said reel driving disk by said spring members, and selectively operable means coupled to said brake disks of each said brake means to effect movement of said brake disk of each of said brake means along said helical path thereof to disengage said brake disks from their respective said reel driving disks.

9. In a reeling system for driving a reelable member between a supply reel and a takeup reel, means including disks for driving each of said reels, brake means operatively coupled to each of said reel driving disks, each of said brake means including a brake disk defining a brake surface, a mounting bracket, leaf spring members connected between said brake disk and said mounting bracket for supporting said brake disk in spaced relation with respect to said bracket, each of said leaf spring members having parallel end portions and an angularly disposed intermediate portion, one of said end portions being secured to said bracket while the other of said end portions is secured to said brake disk, said intermediate portion forming an angle of about 45° with said brake surface, said spring members being secured to said brake disk in spiral array to define a helical path of movement for said brake disk, said brake disk being biased into braking engagement with its associated said reel driving disk by said spring members, and selectively operable means coupled to said brake disks of each said brake means to effect movement of said brake disks of each said brake means along said helical paths therefor to disengage said brake of each said brake means from the associated one of said reel driving disks.

References Cited in the file of this patent

UNITED STATES PATENTS

| | | |
|---|---|---|
| 1,195,971 | Brush | Aug. 29, 1916 |
| 1,857,185 | Flaherty | May 10, 1932 |
| 2,175,383 | Eason | Oct. 10, 1939 |
| 2,611,618 | Camras | Sept. 23, 1952 |
| 2,626,760 | Chick | Jan. 27, 1953 |
| 2,652,988 | Godeck | Sept. 22, 1953 |
| 2,769,511 | Hayes | Nov. 6, 1956 |
| 2,877,958 | Moore et al. | Mar. 17, 1959 |

FOREIGN PATENTS

| | | |
|---|---|---|
| 657,629 | Great Britain | Sept. 26, 1951 |